J. BOYCE.
MANUFACTURE OF CATALYSTS.
APPLICATION FILED JUNE 2, 1913.
1,339,686.
Patented May 11, 1920.
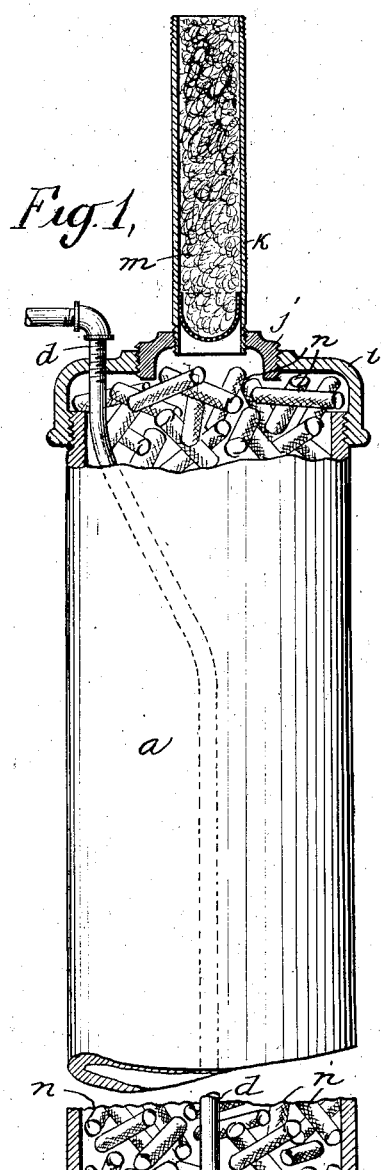
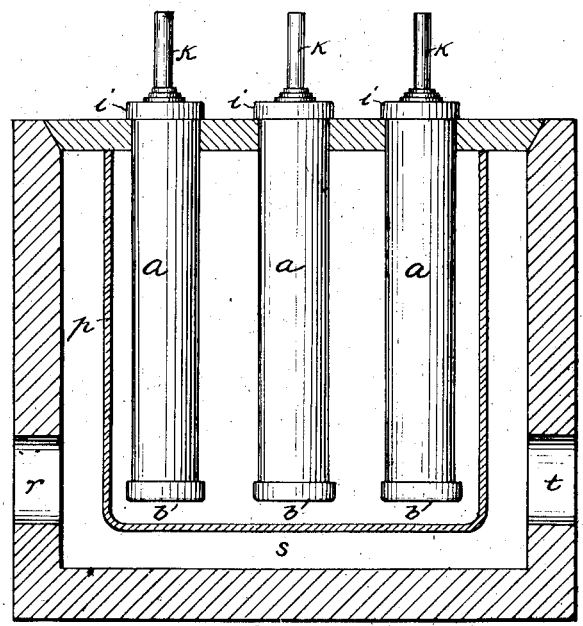
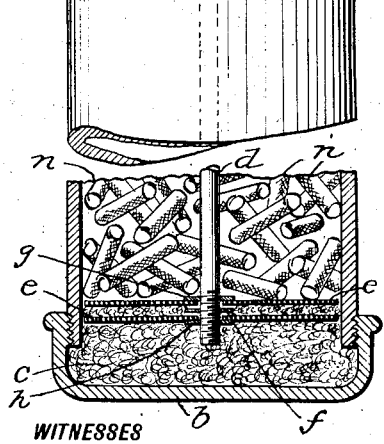
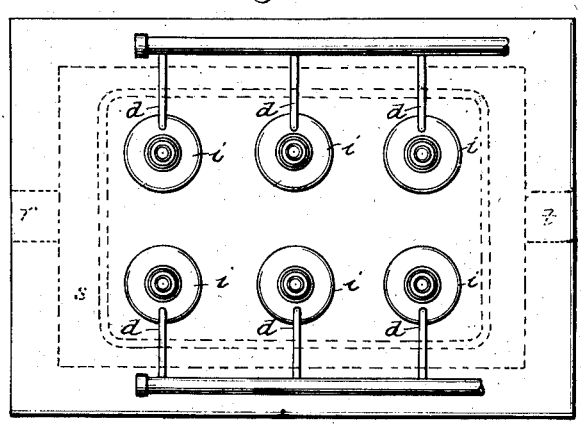
WITNESSES
INVENTOR:
James Boyce,
BY
Tennie, Davis & Goldsborough
ATTORNEYS.

UNITED STATES PATENT OFFICE.

JAMES BOYCE, OF CHICAGO, ILLINOIS, ASSIGNOR TO THE AMERICAN COTTON OIL COMPANY, OF GUTTENBERG, NEW JERSEY, A CORPORATION OF NEW JERSEY.

MANUFACTURE OF CATALYSTS.

1,339,686. Specification of Letters Patent. Patented May 11, 1920.

Application filed June 2, 1913. Serial No. 771,325.

*To all whom it may concern:*

Be it known that I, JAMES BOYCE, a citizen of the United States, residing at Chicago, county of Cook, State of Illinois, have invented certain new and useful Improvements in the Manufacture of Catalysts; and I do hereby declare the following to be a full, clear, and exact description of the invention, such as will enable others skilled in the art to which it appertains to make and use the same.

My invention relates to certain new and useful improvements in the production of contact bodies or catalysts designed particularly for employment in the hydrogenation of unsaturated fats and the like, but capable of general employment in similar operations, involving catalytic or contact action. In these operations, it is important that the catalyst should present a large extent of surface for the total weight of metal employed, or, otherwise stated, that the minimum quantity of metal should be employed for obtaining the extent of contact surface desired.

In practice, I find that by the use of catalysts produced in accordance with my invention, I have been able to obtain, in the hydrogenation of fats and the like, a quicker result and a better product, produced at a lower temperature as compared with operations wherein the catalyst employed is a powdered metal, as, for instance, powdered nickel.

My invention involves, as one of its main characteristic features, the deposit of the nickel or other catalyzing metal upon the individual grains of a finely divided or pulverulent carrier, such as pumice stone. These finely divided individual grains of inert material take the place of the main body portion of the particles of powdered metal usually employed, or may be considered as individual cores upon which are uniformly spread superficial coatings presenting a much larger contact surface than the same weight of metal in the pulverized condition. Consequently, the superficial deposits upon the minute particles of pumice stone very largely increase the activity of the catalyst for the weight of metal employed, and nevertheless leave the catalyst in the form of minute particles capable of being mechanically stirred into the liquid mass whose hydrogenation is to be effected, so as to present thereto constantly changing contact surfaces.

In the production of catalysts, in accordance with my invention, the metal, as will hereinafter more fully appear, is reduced from the oxid. Thus, the oxid of nickel is reduced by means of hydrogen gas, preferably obtained, in a state of great purity, from the electrolysis of distilled water, and I have discovered that in applying the hydrogen gas to the nickel oxid a very effective and superior catalyst is produced by stopping the reduction of the oxid before such reduction is quantitatively complete. In fact, in practising my invention, I aim to produce a catalyst from nickel that may be termed "nickel black," in contradistinction to completely reduced nickel, whose predominating color is gray.

I have found that this nickel black is an incompletely reduced metal, there still being some oxygen in its composition. The presence of oxygen in the nickel black is evidenced by the fact that, when subjected to the action of hydrogen gas, at reaction temperatures, watery vapor will be present in the issuing gas current. Accordingly, in practice, the reducing action of the hydrogen upon the nickel oxid is interrupted at a stage before the disappearance of watery vapors in the issuing current of hydrogen, and the period at which the said interruption takes place is so chosen that the product shall be black or preponderatingly black in color. The interruption of the reduction can be brought about either by cutting off the supply of hydrogen gas, or, preferably, by reducing the temperature below that necessary for reaction.

I have found that the blacker the color of the nickel black, the greater is its activity and the longer its life as a catalyst,—particularly in the hydrogenation of oil; for which reason, a relatively small amount of the nickel black is effective in the hydrogenation of a given quantity of oil, and that it is highly effective at low temperatures, that is to say, below the temperature of formation of the fatty acids, for which reason it is especially adapted to the hydrogenation of edible oils and fats.

In the accompanying drawings—

Figure 1 represents, in longitudinal section, a suitable reduction tube wherein that part of my invention which relates specifically to the reduction of the catalyst from its oxid may be effected;

Fig. 2 represents the longitudinal section of a furnace structure appropriate for the heating of reaction tubes of this character; and Fig. 3 represents a top plan view thereof.

Similar letters of reference indicate similar parts throughout the several views.

In carrying out my invention, I prefer to proceed from commercial metallic nickel as a starting point. I treat it in an earthenware jar or like receptacle with at least the theoretical quantity of nitric acid and water to produce, when hot, a solution of nitrate of nickel, and which, if permitted to cool would take on the form of a solid crystallized nitrate of nickel, the heat of combination sufficing, in that event, to drive off the water present. Instead of using exactly the theoretical quantity of nitric acid, in making the nitrate, I prefer to work somewhat on the acid side, that is to say, I prefer to use a slight excess of nitric acid for a purpose hereinafter to be described.

The supersaturated solution of nitrate of nickel is not permitted to cool, but is added, while still hot, to the pumice stone powdered to say 80 mesh, which is to serve as the carrier for the metal, and which is employed in the proportion of approximately one part by volume of powdered pumice stone to three parts by volume of the hot solution. The advantage, just indicated, of employing a slight excess of acid in making the solution of nickel nitrate is that it is found to act superficially upon the surface of the individual particles of pumice stone, thereby minutely indenting or recessing the individual particles and giving them a larger "coast line" or peripheral area upon which to receive the nitrate of nickel deposit. It is found in practice that in the hot state, the nickel nitrate immediately adheres in crystallized form to the minute particles of pumice and there is no necessity, therefore, of driving off any excess of water present, in order to obtain such adhesion.

The particles of pumice with their superficial coating of nickel nitrate are then spread out in a flat pan to a depth of from one to three inches and the pan is thereupon gently heated, whereby the nickel nitrate is changed into nickel oxid. It is of particular importance that the material be subjected to the heating operation in a relatively shallow layer as indicated. If the layer is too deep, it is found that it becomes so hard at the end of the heating operation that it can only be removed from the receptacle with difficulty and requires re-grinding, whereas, if of the lesser depth indicated, it may be removed in an entirely friable condition. Care must also be taken to heat the pan equally throughout and to restrict the amount of water present as far as possible, so as to lessen the tendency for the mass to agglomerate or ball up.

The impregnated pumice, which now has a coating of nickel oxid, and is in a condition (more or less complete) of fine powder, depending upon the care with which the heating operation has been carried on, is then sifted into a reduction tube, which is preferably of the type shown in the drawing, and is subjected therein to heat, while, at the same time, a gentle current of hydrogen gas is allowed to act upon the powdered mass, thus exerting a reducing effect upon the oxid, which still firmly adheres to the pumice powder. The hydrogen gas is preferably electrolytic hydrogen, that is to say, hydrogen produced from the electrolysis of water, the water being preferably distilled so that the hydrogen may be as pure as possible.

When first introduced into the tube, the coating of nickel oxid is black, that is to say, it is the color of black oxid of nickel, $Ni_2O_3$. As the reaction proceeds, the color changes to green, in the upper layers, which is probably due to the transference of a part of the oxygen from the partially reduced $Ni_2O_3$, and the consequent formation temporarily of the green oxid NiO. Finally, however, if the reducing operation is interrupted at the proper time, the entire mass will be converted into nickel black. The time for interrupting the reduction can be determined, for instance, by interposing a cold plate momentarily in the path of the outgoing gases near the end of the period which would correspond to complete reduction, and noting that moisture is deposited upon the plate, which thereby indicates that complete reduction has not yet occurred. The skilled operator will, after a few trials, be able to determine the exact point at which the reduction should be interrupted in order to obtain the nickel black, under the particular conditions of temperature, gas pressure, size of apparatus, and the like, under which he is operating, bearing in mind that the final product should be black or preponderatingly black, in contradistinction to gray.

Referring to the drawings, which illustrate a convenient apparatus for the production of the catalyst, the main body portion $a$ of the reduction tube therein shown may conveniently consist of a wrought iron pipe having at its lower end a screw cap $b$ for the reception of a body $c$ of loose asbestos or the like, constituting a diffusion space for the hydrogen gas, which latter may be admitted through an inlet pipe $d$, as shown. The inlet pipe may conveniently be screw-threaded at its lower end to serve as the support of two wire screens $e$ of say one-eighth of an inch mesh, which are separated from each other by the intervening nut $f$ and which are removably locked in place by lock nuts $g$, $h$, an intervening layer of asbestos being provided, which serves as a filter for the hydrogen gas. The screens and the intervening layer of asbestos likewise prevent the powdered material from sifting through into the diffusion space and clogging it up.

At its upper end, the reduction tube is provided with a screw cap $i$ through which the gas inlet tube $d$ is admitted and which may be suitably connected to the source of hydrogen supply, as, for instance, by the coupling elbow shown. The screw cap $i$ is provided with a screw-threaded bushing $j$ which is removable for the purpose of filling the tube. The bushing $j$ is itself provided with a screw-threaded aperture within which fits the screw-threaded end of a tube $k$ containing a perforated screen $l$ and having a filling $m$ of loose asbestos. The upper end of the tube $k$ is likewise screw-threaded or otherwise adapted to be connected to a suitable source of collection for the gas issuing from the reduction tube, the purpose of the loose asbestos filling $m$ being to filter from the outgoing gases any dust which they might otherwise carry, and to prevent any sudden blowing out of any portion of the fine material should the gas pressure, for any reason, suddenly increase within the tube.

In practice, I find it desirable, for the successful use of reduction tubes of this kind, to first fill them, practically to the top, with a series of bodies of such a character as will prevent packing of the pulverulent material and which will prevent channeling of the mass during the passage of the gas. To this end, I have found it advantageous to employ a filling of small rolls or cylinders $n$ of iron wire screen material, of about fly-screen mesh, and which for a pipe $a$ of eight inches diameter, may conveniently be of say one inch diameter and four inches in length. When the reduction tube is filled with these rolls or cylinders $n$, so that there is continuous contact from top to bottom, they serve not only as a means for assisting the flow of the gas and of the water vapor or steam incident to the reduction of the nickel oxid, but also serve to transmit the heat throughout the mass and to more fully equalize its distribution, to the general advantage of the operation.

As indicated in Figs. 2 and 3, the reduction tubes may conveniently be heated by inserting them within a suitable heating furnace. In order that any particular one of the tubes may be readily withdrawn from the furnace, if necessary, without disturbing the heating of the remainder, it is found suitable to locate them within an interior box or chamber $p$ of iron or of fire brick, which box or chamber is heated externally by products of combustion from any suitable source, admitted at an inlet $r$ into a flue $s$ which encompasses the inner compartment $p$ and which has an exit at $t$, as indicated.

It may be said, however, that if the tubes are properly protected against radiation, and are heated at one point (say the bottom portion) to a sufficient initial heat to begin the reaction between the hydrogen and the nickel oxid (which initial heat will be in the neighborhood of 500° F.) the chemical heat of reaction developed is propagated throughout the mass and is sufficient to maintain the reducing operation without relying upon the supply of additional heat from the furnace gases. In fact, if the reaction is well started in the reduction tubes, it is feasible to entirely cut off the supply of heating gases to the furnace, the excess heat of reaction supplying the radiation losses and the temperature conditions in the tubes remaining such as to permit the reduction of the nickel oxid to proceed therein to the desired point.

I find it suitable and desirable to admit the hydrogen gas under a pressure of about 10 inches of water, that is to say, under such a pressure as to suffice merely to overcome the resistance due to its passage through the reduction tube and the contents thereof, and to issue gently at the top of the asbestos-filled tube $k$, and, if desired, the hydrogen, as it issues from the tubes $k$ may be ignited thereat, so as to avoid any possibility of the formation of an explosive mixture with the air of the room in which the apparatus is contained. It will, of course, be understood that in making the test for moisture, hereinbefore referred to, the flame of any such burning hydrogen would first be extinguished.

After the nickel oxid has been sufficiently reduced, the catalyst mass is cooled in a current of hydrogen until the tubes are cool enough to handle, whereupon they are sealed by applying a suitable screw-threaded cap to the screw-threaded upper end of the dust filter tube $k$. They are then allowed to stand until absolutely cold, whereupon when needed for use, they are emptied, and the pulverulent catalyst made up of the finely divided particles of pumice with their peripheral coating of nickel black, is screened out from the mass of rolls or cylinders $n$, and is found to be non-pyrophoric, and otherwise fully available for the purposes for which it is intended.

So far as I am aware, it is broadly new to obtain nickel in the form of catalytically active nickel black, whether deposited upon a carrier such as powdered pumice, or otherwise. It will therefore be understood that I intend to claim the substance broadly.

Having thus described my invention, what I claim is:

1. The method of forming a coating of catalytic material on an inert carrier therefor which comprises pulverizing to a granular mass the substance which is to serve as the inert carrier, mixing with the said mass an adherent material capable of conversion to a catalytic condition to coat the individual grains with said adherent material and then converting the coating thus formed to a catalytic condition; substantially as described.

2. The method of applying catalytic material to an inert carrier therefor which comprises pulverizing into a granular mass the substance which is to be used as the inert carrier, mixing said mass with a reducible metallic salt to coat the individual grains thereof with the said salt, and then converting the coating thus formed into a catalytic state; substantially as described.

3. The method of applying a coat of catalytic material to an inert carrier therefor which comprises pulverizing into a granular mass the substance which is to be used as the carrier, mixing said mass with a reducible metallic salt to coat the individual grains thereof with the said salt and converting the coating thus formed into an oxid; substantially as described.

4. The method of applying a coat or catalytic material to an inert carrier therefor which comprises pulverizing to a granular mass the substance which is to serve as the inert carrier, mixing the said mass with hot nitrate of nickel to coat the individual grains thereof and then converting the coating thus formed to a catalytic condition by first changing it to nickel oxid by heat and then reducing the oxid by hydrogen; substantially as described.

5. The method of producing a catalyst, which comprises coating the individual grains of a mass of powdered material with a reducible metallic salt, converting the salt into an oxid under conditions that will maintain the mass readily friable, and reducing the oxid to the degree required for the desired catalyst; substantially as described.

6. The method of producing a catalyst, which comprises depositing nickel nitrate upon powdered material from a slightly acid solution of nickel nitrate, thereby causing the solution to minutely indent or recess the individual particles of the powdered material, converting the nickel nitrate into nickel oxid and finally subjecting the nickel oxid to the reducing action of hydrogen until the desired catalyst is obtained; substantially as described.

7. The method of producing a catalyst, which comprises depositing upon powdered material a hot solution of nickel nitrate of such supersaturation that when cool it will adhere to said particles in the form of solid crystallized nickel nitrate; converting the nickel nitrate into nickel oxid, and subsequently subjecting the nickel oxid to the reducing action of hydrogen until the desired catalyst is obtained; substantially as described.

8. The method of producing a catalyst, which comprises depositing upon the individual grains of powdered material a coating of nickel nitrate, in crystallized form, spreading out the coated particles in a shallow layer and gently heating the same thereby converting the nickel nitrate into nickel oxid, and subsequently subjecting the nickel oxid to the reducing action of hydrogen until the desired catalyst is obtained; substantially as described.

9. The method of producing a catalyst, which comprises coating powdered material with nickel oxid, and subjecting the nickel oxid coating to the reducing action of hydrogen, in the presence of heat conducting material interspersed throughout the mass, until the desired catalyst is produced; substantially as described.

10. The method of producing a nickel catalyst, which comprises subjecting nickel oxid to the reducing action of hydrogen, and interrupting the reduction in its final stages before complete reduction and with the obtaining of an active catalytic material that is predominatingly black; substantially as described.

11. The method of producing a nickel catalyst, which comprises subjecting nickel oxid to the reducing action of hydrogen, and interrupting the reduction in its final stages before complete reduction and with the obtaining of an active catalytic material that is predominatingly black, and cooling the resulting product in a current of hydrogen; substantially as described.

12. The method of preparing a catalyst consisting in subjecting a high oxid of nickel to the reducing action of hydrogen to produce a compound in which the nickel is contained mainly as one or more suboxids.

13. A catalyst, comprising catalytically active nickel black.

14. A catalyst, comprising catalytically active nickel black deposited upon a powdered material.

In testimony whereof I affix my signature in presence of two witnesses.

JAMES BOYCE.

Witnesses:
JNO. F. LAYER,
GEO. R. FOLLAND.